Sept. 11, 1951   J. D. RUST   2,567,301
SUDS-FORMING AND MOISTURE-SUPPLYING MEANS
FOR SPINDLE MOISTENING APPARATUS
Filed Oct. 25, 1948   2 Sheets-Sheet 1

INVENTOR,
John D. Rust,
BY
Albert E. Dieterich,
ATTORNEY.

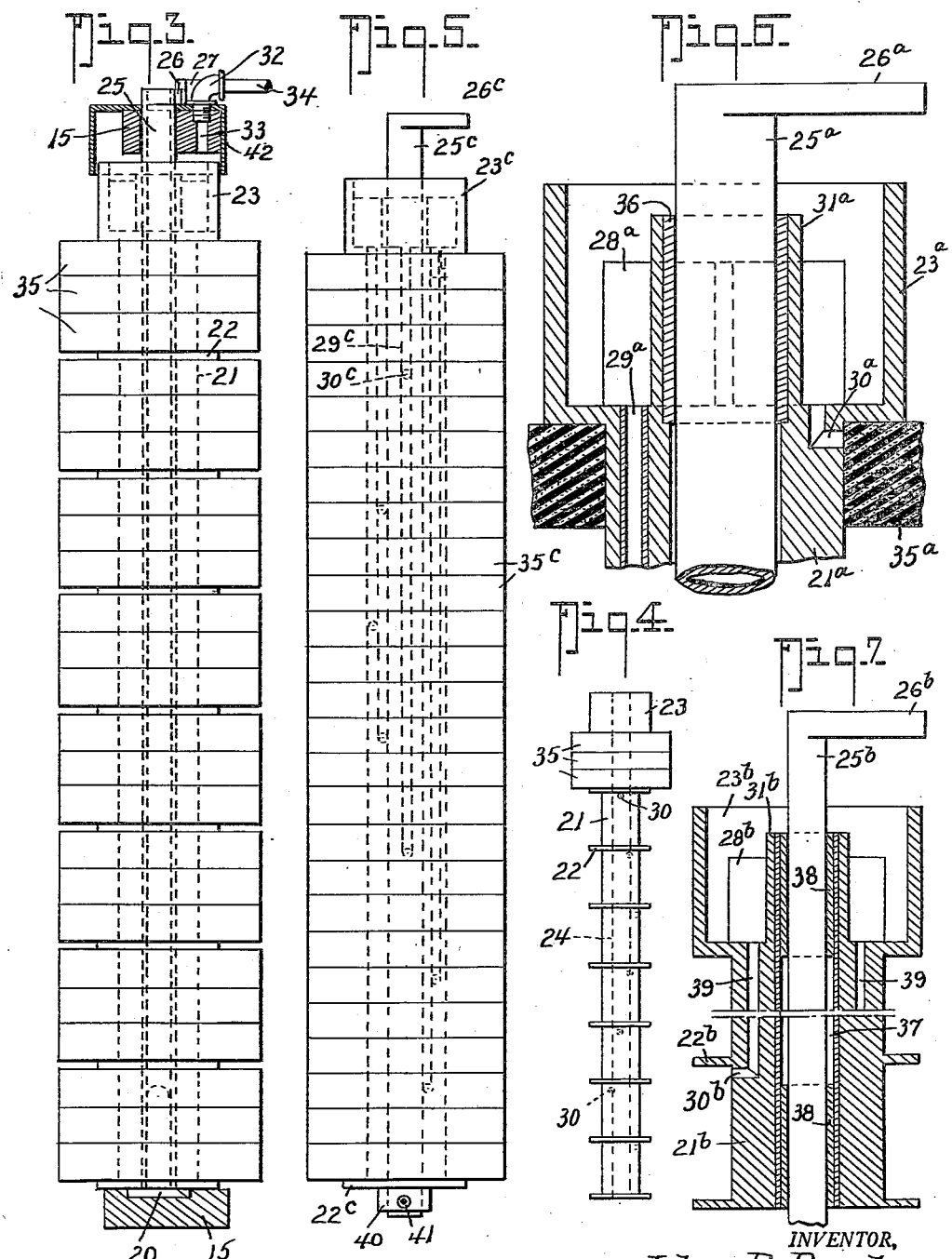

Patented Sept. 11, 1951

2,567,301

UNITED STATES PATENT OFFICE 2,567,301

SUDS-FORMING AND MOISTURE-SUPPLYING MEANS FOR SPINDLE MOISTENING APPARATUS

John D. Rust, Memphis, Tenn.

Application October 25, 1948, Serial No. 56,328

16 Claims. (Cl. 56—41)

My invention relates in general to cotton picking machines of the rotating spindle type.

A survey of the cotton picker art will show that there have been two approaches to the problem of making rotating spindles effective in wrapping up cotton and removing it from the plant. The first approach was to provide the spindle with teeth with which to positively catch the lint. The other was to apply moisture to a smooth spindle to cause it to wrap up the lint. The last approach is the one I have used from the beginning of the development of my wire spindle cotton picker. However, as the patent records will show, I have found by experience that the smooth wire spindles become so highly polished in operation that the picking efficiency becomes considerably decreased. Therefore I spent a great deal of time and effort in developing means for creating and maintaining a slightly roughened surface on the spindles in order to increase their effectiveness for picking the open cotton. I have found that the picking efficiency of the spindles can be greatly increased when the spindles are moistened by having suds or foam applied to them.

My present invention has for its object to provide a more efficient means to generate the suds and apply the moisture to the spindle moistening rings than that disclosed in my prior invention. To this end the present invention in its generic aspect has for its object to provide a rotatable sponge carrying member or roller with provision for supplying suds forming liquid for example, sodium alkyl aryl sulfonate solution, to the same, said member being in rolling contact with the rotatable bank of spindle moistening rings, whereby as the spindles cause rotation of said bank of rings, the rings will cause the sponge-roller to turn on its axis thereby progressively squeezing and releasing portions of the sponge to set up the necessary action to generate the suds.

Other objects will in part be obvious and in part be pointed out hereinafter.

To the attainment of the aforesaid objects and ends invention still further resides in the novel details of construction, combination and arrangement of parts, all of which will be first fully described in the following detailed description, and then be particularly pointed out in the appended claims, reference being had to the accompanying drawing, in which:

Fig. 4 is a reduced scale elevation of the suds-forming, moisture-supplying roller with all but the top three sponges omitted.

Fig. 5 is an elevation of a modified form of suds-forming, moisture-supplying roller.

Fig. 6 is an enlarged detail central vertical section and part elevation of another modification.

Fig. 7 is a detail central vertical section and part elevation of a further modification.

Fig. 8 is an elevation on a reduced scale showing the relation of the rotary spindle moistener to the suds-forming, moisture-supplying roller.

Figure 1:
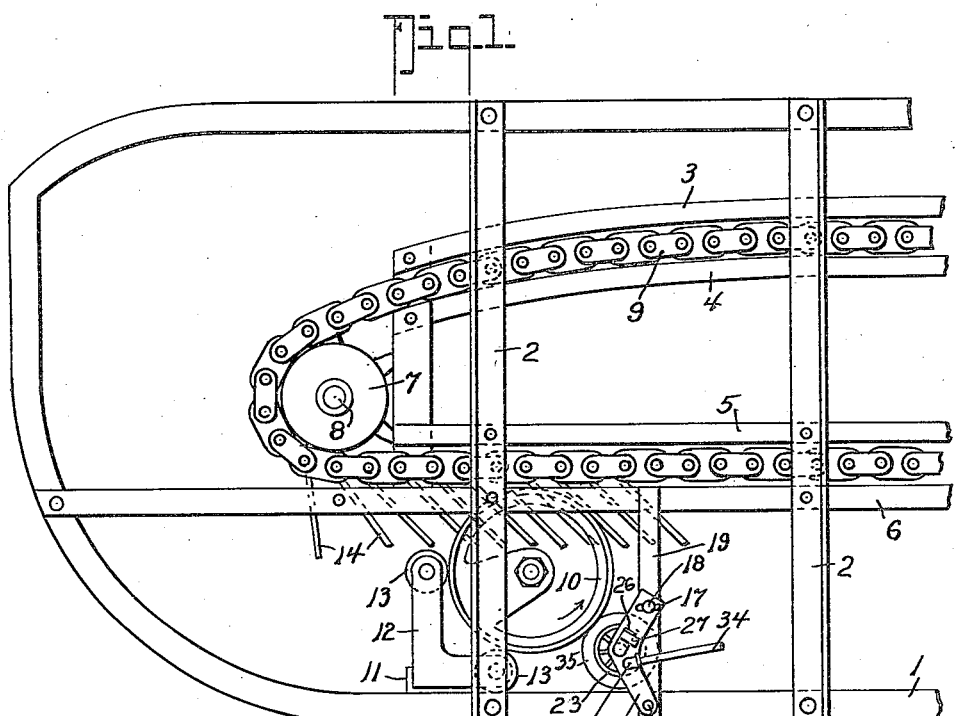
Fig. 1 is a top plan view of a portion of a Rust cotton picking machine with the covers removed.

In the drawings in which like numerals and letters of reference indicate like parts in all the figures, I represents the main frame of a Rust cotton picker, 2 the cross bars, 3, 4, 5, 6 the guides for the conveyor, 7 the drive sprocket, 8 the drive shaft and 9 the endless chain of spindle slats, and 14 the spindles, all of which are well known.

10 designates the spindle moistener consisting of a vertical series or bank of spindle engaging rings 10ᵃ bolted together to turn as one, by the bolt and nut 10ᵇ with spaces 10ᶜ between the rings.

Rigidly secured, in any approved way, to a support 11 are upper and lower supporting angles 12 carrying a pair of moistener-supporting rollers 13. In operation the spindles 14 are drawn between the rings 10ᵃ in frictional contact with the same and turn the unit in the direction of the arrow in Fig. 1. All the foregoing structure is known and per se is not of my present invention.

Figure 2:
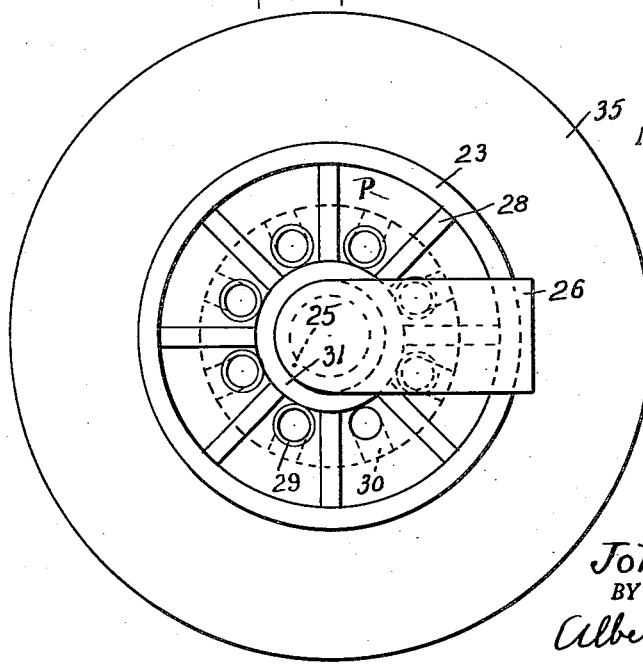
Fig. 2 is an enlarged top plan view of the suds-forming, moisture-supplying roller, the cup cap being omitted.
Figure 3:
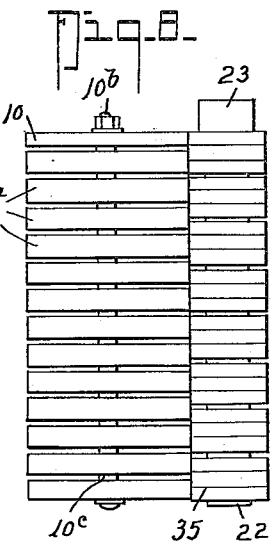
Fig. 3 is a side elevation on another scale of the suds-forming, moisture-supplying roller in its supports, the supports and the cup-cover being shown in section.

Mounted on cross bars 19 are brackets 15 (upper and lower) which are pivoted at 16 and have a slot 17 through which a bolt 18 passes, adjustably to position the bracket. Mounted in the brackets is a shaft 25 having a cross head 26 to pass under an angle stop 27 on the upper bracket 15 (see Figs. 1 and 3). Journalled on the shaft 25 is a light weight (preferably cast aluminum) roller 21 having a cup 23 at its upper end and a set of spaced-apart flanges 22 between pairs of which sponge rubber rings 35 are located (preferably in three ring sets), see Figs. 3 and 8. In Fig. 3 is shown a bearing recess 20 in the lower bracket in which the lower end of the roller 21 rests. The roller 21 is bored, as at 24 (Fig. 4), and has its cup 23 divided into a series of pockets P by partitions 28 (Fig. 2). Between each pair of flanges 22 is a port 30. The several ports 30 connect with respective pockets P, by means of ducts or passages, bored directly in the casting as at 39 in Fig. 7 or formed by pipes 29, cast in the spool roller 21, best shown in Figs. 2 and 6.

The spool 21 at the upper end has a cup 23 having a center boss 31 and a set of partitions 28 dividing the cup into a corresponding number of pockets P. The partitions 28 do not extend up the full height of the cup or of the boss 31 (see Figs. 6 and 7). The upper bracket 15 is bored at 33 (Fig. 3) to receive an elbow 32 to which the solution supply pipe 34 is connected. The bore 33 is directly over the cup 23 so that solution is deposited into each pocket P as that pocket comes under the bore. The solution from the pockets P flows down its respective duct 29 to the corresponding port 30 and is absorbed by the sponge rings. In the modified form shown in Fig. 5 the flanges 22 are omitted and the rings 35c are held on the roller between the cup 23c and a flange 22c on the roller, a collar 40 and set screw 41 holding the roller on the shaft 25c. Other parts shown in Fig. 5 which correspond to like parts in the preceding figures bear the same reference numerals plus the index letter c, and a repetition of their description here is unnecessary.

In practice instead of having the spool roller 21 to rotate directly on pipe or shaft 25 bearing bushings 36 (Fig. 6) may be replaceably mounted in the ends 31a of the spool roller 21a or a pipe 37 may be cast in the spool roller as an integral part of the same (Fig. 7) and bearing bushings 38 inserted in the ends of the pipe, in which event a shaft 25b of smaller diameter can be used.

In Figs. 6 and 7 those parts which correspond to like parts in the preceding figures bear the same number plus the index letter $a$ and $b$ respectively and need not be re-described here.

By adjusting the brackets toward or from the spindle moistener 10 the sponges 35 can be deformed more or less at contact with the moistener 10. In practice I have found good results can be obtained when the distance between the shaft 25 and the periphery of the moistener rings 10a is about ¼" less than the natural radius of the sponges.

From the foregoing it will be seen that the spindle moistener proper 10 is supported in place by the spindles between the rings 10a and the three rollers 13, 13 and 21, 35, thus there is no wiping drag to oppose the spindles effecting rotation of the moistener 10 as in the structures of my two above mentioned applications.

When the spindle carrying belt is in motion, the rubber covered rings are automatically rotated and they in turn automatically rotate the aluminum roller with the sponge rings. The yielding motion of the sponges serves not only to give a positive application of liquid to the rubber covered rings, but also the working in and out of the sponges as they rotate has proved to be a very effective method of converting the liquid to a foam or lather and automatically applying the same to the rubber covered rings, 10a.

The casting, as will be noted, is designed to equally distribute the liquid to the sponges. The liquid is fed into the top cup near the outer rim so that as the casting is rotated, each of the eight individual pockets will receive an equal amount of the flowing liquid. The liquid in turn flows through the individual copper tubes to the individual groups of sponges. There is one outlet just below each flange on the roller, except, of course, the bottom one.

The inverted cup cap 42 is provided for the aluminum casting to keep trash, lint, etc. out of the liquid dispensing cups. The cover does not rotate and is designed to have running clearance.

Experience has shown this method of applying moisture to the rubber rings to be a very effective way of distributing and applying the liquid.

From the foregoing description, taken in connection with the accompanying drawings, it is thought that the construction, operation and advantages of the invention will readily appear to those skilled in the art.

What I claim is:

1. In a cotton picking machine wherein is provided a rotary spindle moistener, the improvement which comprises a sponge-roller mounted with its periphery in contact with said rotary moistener, and means to supply a suds forming liquid to said sponge-roller, said sponge-roller including a spool roller having a cup at its upper end with partitions dividing the cup into a set of individual pockets, said spool having ports in its periphery, there being a port for each corresponding pocket, said roller having ducts from the respective pockets to the corresponding ports, and a sponge rubber cylinder on the periphery of said roller.

2. In a cotton picking machine wherein is provided a rotary spindle moistener, the improvement which comprises a sponge-roller mounted with its periphery in contact with said rotary moistener, and means to supply a suds forming liquid to said sponge-roller, said sponge-roller including a spool roller having a cup at its upper end with partitions dividing the cup into a set of individual pockets, said spool having ports in its periphery there being a port for each corresponding pocket, said roller having ducts from the respective pockets to the corresponding ports, and a sponge rubber cylinder on the periphery of said roller, said cylinder being composed of superposed rings.

3. In a cotton picking machine wherein is provided a rotary spindle moistener the improvement which comprises a sponge-roller mounted with its periphery in pressure contact with said rotary moistener, and means to supply suds-forming liquid to said sponge-roller, said sponge-roller including a cylindrical casting embracing a central pipe, shaft bearings in said pipe, said casting including a cup at the top and an annular flange at the bottom, and a sponge on said casting between the cup and flange, said cup having partitions dividing the cup into a number of pockets for receiving liquid, said casting having separate ducts from said pockets to deliver liquid to the sponge at different locations along the length of said casting, by virtue of all of which the successive compressing and releasing of the portions of the sponge in engagement with the rotary spindle moistener will generate suds from said liquid and apply the same to said rotary moistener.

4. In a cotton picking machine wherein is provided a rotary spindle moistener the improvement which comprises a sponge-roller mounted with its periphery in pressure contact with said rotary moistener, and means to supply suds-forming liquid to said sponge-roller, said sponge-roller including a cylindrical casting, said casting including a cup at the top and an annular flange at the bottom, and a sponge on said casting between the cup and flange, said cup having partitions dividing the cup into a number of pockets for receiving liquid, said casting having separate ducts from said pockets to deliver liquid to the sponge at different locations along the length of said casting, said ducts including ports on the periphery of the casting and pipes connecting the cup pockets with respective ducts, by virtue of all of which the successive compressing and releasing of the portions of the sponge in engagement with the rotary spindle moistener will generate suds from said liquid and apply the same to said rotary moistener.

5. In a cotton picking machine wherein is provided a rotary spindle moistener the improvement which comprises a sponge-roller mounted with its periphery in pressure contact with said rotary moistener, and means to supply suds-forming liquid to said sponge roller, said sponge-roller including a cylindrical casting, said casting including a cup at the top and an annular flange at the bottom, and a sponge on said casting between the cup and flange, said cup having partitions dividing the cup into a number of pockets for receiving liquid, said casting having separate ducts from said pockets to deliver liquid to the sponge at different locations along the length of said casting, by virtue of all of which the successive compressing and releasing of the portions of the sponge in engagement with the rotary spindle moistener will generate suds from said liquid and apply the same to said rotary moistener.

6. In a cotton picking machine wherein is provided a rotary spindle moistener the improvement which comprises a sponge-roller mounted with its periphery in pressure contact with said rotary moistener, and means to supply suds-forming liquid to said sponge-roller, said sponge-roller comprising a cylindrical body having a liquid receiving cup at its upper end and a set of spaced annular flanges below the cup, sponge rings on the body between adjacent annular flanges, said body having ducts from the cup to the sponges between the several flanges and beneath the cup, by virtue of all of which the successive compressing and releasing of the portions of the sponge in engagement with the rotary spindle moistener will generate suds from said liquid and apply the same to said rotary moistener.

7. In a cotton picking machine wherein is provided a rotary spindle moistener a sponge-roller rotatably mounted in the machine adjacent said rotary moistener and in rolling pressure contact with the same whereby rotation of the rotary moistener will effect rotation of the sponge-roller, said sponge-roller including a cylindrical body having spaced flanges on its periphery, sponge rings on said body between said flanges and means to pass suds-forming liquid via said body to said sponge rings, by virtue of all of which the successive compressing and releasing of the portions of the sponge in engagement with the rotary spindle moistener will generate suds from said liquid and apply the same to said rotary moistener.

8. In a cotton picking machine wherein is provided a rotary spindle moistener a sponge-roller and means to mount said sponge-roller in pressure engagement with said rotary moistener, said sponge-roller including a cylindrical body having a cup at its upper end and a series of spaced-apart flanges below said cup, sponge rubber rings on said body between adjacent rubber rings, said body having a port between each adjacent pair of flanges, said cup having a set of partitions dividing it into a set of pockets one for each port, said body having ducts between each pocket and its respective port, said body having a shaft receiving bore, and a removable shaft passing through said bore, and means for mounting said shaft, by virtue of all of which the successive compressing and releasing of the portions of the sponge in engagement with the rotary spindle moistener will generate suds from said liquid and apply the same to said rotary moistener.

9. In a cotton picking machine wherein is provided a rotary spindle moistener, a sponge-roller and means to mount said sponge-roller in operative engagement with said rotary moistener, said sponge-roller including a cylindrical body having a cup at its upper end and a series of spaced-apart flanges below said cup, sponge rubber rings on said body between adjacent rubber rings, said body having a port between each adjacent pair of flanges, said cup having a set of partitions dividing it into a set of pockets one for each port, said body having ducts between each pocket and its respective port, said body having a shaft receiving bore, and a removable shaft passing through said bore, and means for mounting said shaft, said body having bearing bushings for said shaft, by virtue of all of which the successive compressing and releasing of the portions of the sponge in engagement with the rotary spindle moistener will generate suds from said liquid and apply the same to said rotary moistener.

10. In a cotton picking machine, a spindle coating means, the combination with such means of mechanical means for generating suds from a suds-forming material and applying the suds to said spindle coating means.

11. In a cotton picking machine having a spindle coating means, the combination with such means of means for generating suds from a suds-forming liquid and applying the suds to said spindle coating means, said last named means including a spool mounted adjacent said spindle coating means and having sponge rings held in pressure contact with said spindle coating means.

12. Means to generate suds from a suds-forming liquid and apply suds to a cotton picker spindle coating device, said means comprising a sponge-roller mounted to rotate in pressure contact with said coating device, said sponge-roller including a cylindrical body having a cup at its upper end and an annular flange adjacent its lower end, and sponge rings on said body between the cup and flange, said body and cup having passages from said cup to said rings.

13. Means to generate suds from a suds-forming liquid and apply suds to a cotton picker spindle coating device, said means comprising a sponge-roller mounted to rotate in pressure contact with said coating device, and means to supply a suds-forming liquid to said sponge roller, said sponge roller including a cylindrical casting embracing a central pipe, shaft bearings in said pipe, said casting including a cup at the top and an annular flange at the bottom, and a sponge on said casting between the cup and flange, said cup having partitions dividing the cup into a number of pockets for receiving liquid, said casting having separate ducts from said pockets to deliver liquid to the sponge at different locations along the length of said casting.

14. In a cotton picking machine having a rotary spindle-moistener and means to rotate the same, the improvement which comprises a sponge-roller rotatably mounted in the machine adjacent said rotary spindle-moistener and in rolling and pressure contact with the said rotary spindle-moistener whereby rotation of said rotary spindle-moistener will cause rotation of said sponge-roller and effect in the sponge-roller alternate squeeze and release action, a suds-forming liquid, and means to supply said liquid to said sponge-roller, by virtue of all of which suds will be generated from said liquid by the squeeze and release action of said sponge-roller and applied to said spindle-moistener and transferred by said spindle-moistener to the spindles.

15. In a cotton picking machine having picking spindles: the improvement which comprises in combination a foam-forming liquid and mechanical means for generating foam from said liquid and applying the foam to the spindles.

16. In a cotton picking machine having picking spindles: the improvement which comprises a foam-forming liquid, means for generating a foam from said liquid, and means for conveying the foam, so generated, to the spindles.

JOHN D. RUST.

REFERENCES CITED

The following references are of record in the file of this patent:

UNITED STATES PATENTS

| Number | Name | Date |
|---|---|---|
| 1,742,493 | Berry | Jan. 7, 1930 |
| 1,982,884 | Schroeder et al. | Dec. 4, 1934 |
| 2,023,491 | Rust et al. | Dec. 10, 1935 |
| 2,024,690 | Harris | Dec. 17, 1935 |
| 2,369,708 | Baker | Feb. 20, 1945 |
| 2,433,083 | Baker et al. | Dec. 23, 1947 |